Jan. 21, 1930.  F. N. BARD  1,744,255
LUBRICATED PLUG VALVE
Filed May 21, 1925   3 Sheets-Sheet 1
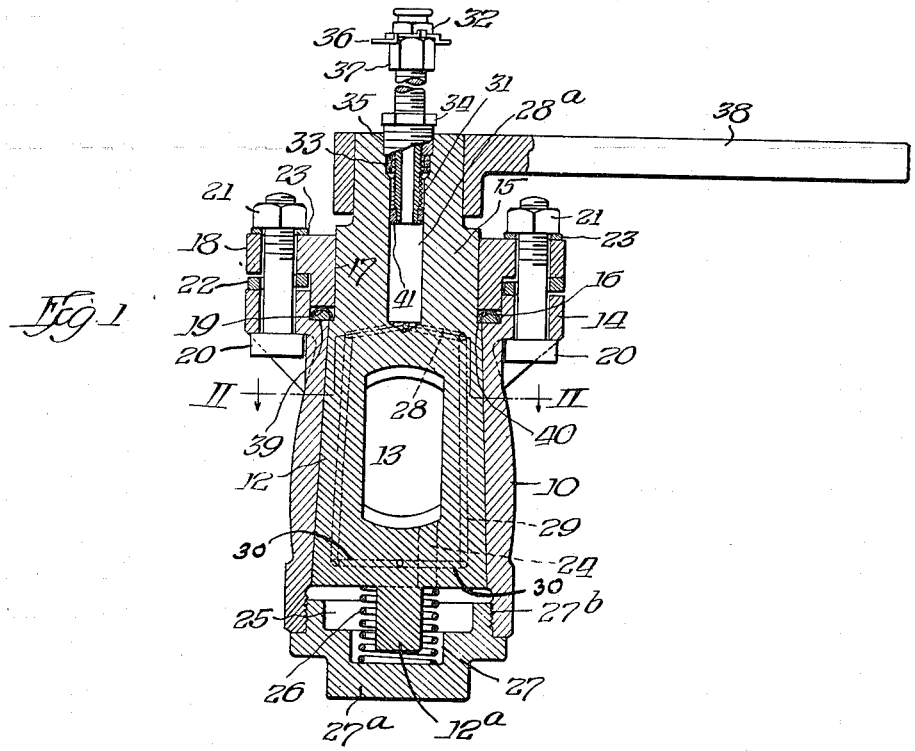
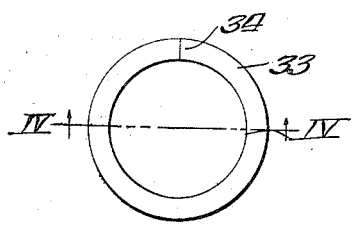
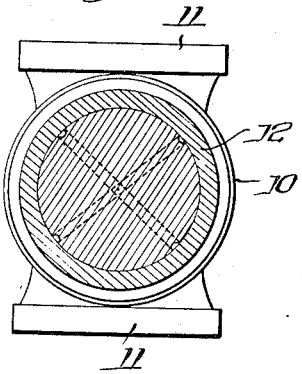
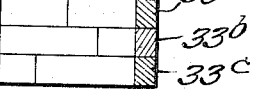
Inventor:
Francis Norwood Bard
by attorney Jan. 21, 1930.   F. N. BARD   1,744,255
LUBRICATED PLUG VALVE
Filed May 21, 1925   3 Sheets-Sheet 2

Jan. 21, 1930.                F. N. BARD                    1,744,255
                          LUBRICATED PLUG VALVE
                          Filed May 21, 1925          3 Sheets-Sheet 3
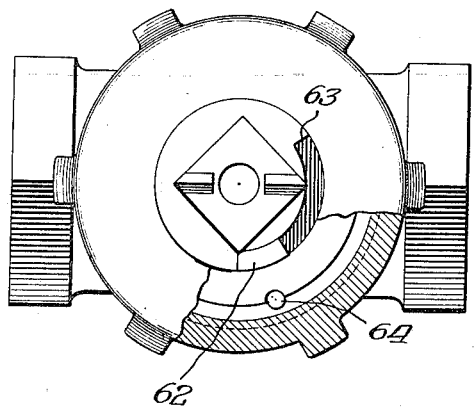
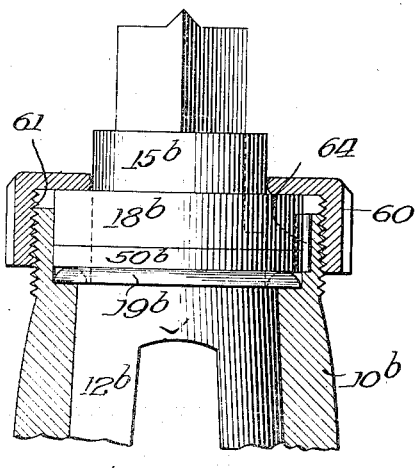
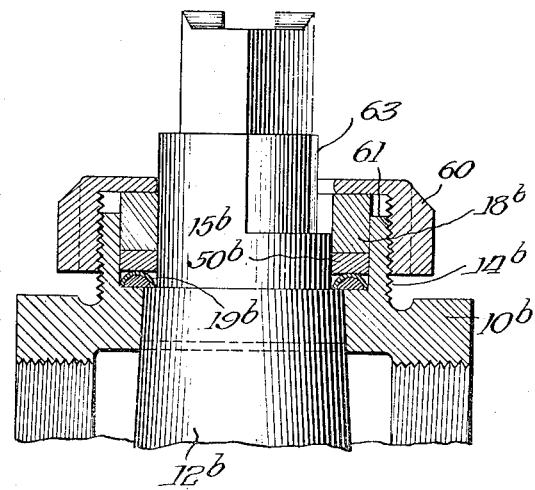
Inventor:
Francis Norwood Bard
by attorney Patented Jan. 21, 1930

1,744,255

UNITED STATES PATENT OFFICE

FRANCIS NORWOOD BARD, OF HIGHLAND PARK, ILLINOIS

LUBRICATED PLUG VALVE

Application filed May 21, 1925. Serial No. 31,806.

The present invention relates in general to valves and more particularly to valves having a lubricant introduced between the valve member and the valve seat, and has special reference to the provision of an improved type of plug valve of the character referred to, wherein lubricant is employed to prevent sticking of the valve upon its seat and to prevent leakage of fluid therebetween.

Among the more important objects of the present invention are the provision of an improved means for introducing the lubricant into the valve mechanism; the provision of improved means for introducing the lubricant between the valve member and the valve seat; the provision of improved means for maintaining a supply of the lubricant in effective position; the provision of improved means for retaining the lubricant from exudation; the provision of an improved packing arrangement for the purposes specified; the provision of an improved yieldingly resistant device for such retention; the provision of improved means for the maintenance of the relation between the valve member and its seat; the provision of means permitting the most accurate adjustment of the lubricant retaining packing; the provision of improved means for preventing injury to the packing during or in consequence of such adjustment; and generally, the improvement of valves and more particularly plug valves, and specifically valves of the character referred to, together with such further objects as may be hereinafter pointed out or appear.

In valves of the character referred to, certain objectionable features difficult to overcome have been met in actual practice, among which may be mentioned the tendency of the lubricant to escape from between the valve member and the valve seat, which involves a tendency of such two elements eventually to stick together, as well as loss of efficiency in the lubricant and additional expense not only for lubricant but also for attention to the lubrication of the valve device; a tendency of the packing to freeze in position, to become distorted, or both; and a danger of permanent distortion of the packing by subjecting it to too great pressure in tightening the valve.

In overcoming the disadvantages referred to and in attaining the objects specified, together with certain additional benefits and advantages to be hereinafter pointed out, I have provided a construction, one embodiment of which is shown in the accompanying drawings, wherein—

Figure 1 is a vertical sectional elevational view of a form of valve device embodying my present improvements;

Figure 2 is a horizontal sectional view of the device of Figure 1 when taken on the line II—II, looking in the direction indicated by the arrows;

Figures 3 and 4 are respectively a plan view and a sectional elevational view of a form of packing employed by me, Figure 4 being taken on the line IV—IV of Figure 3;

Figure 6:
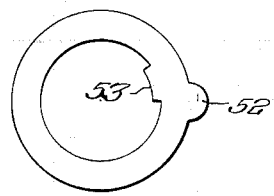
Figure 5:
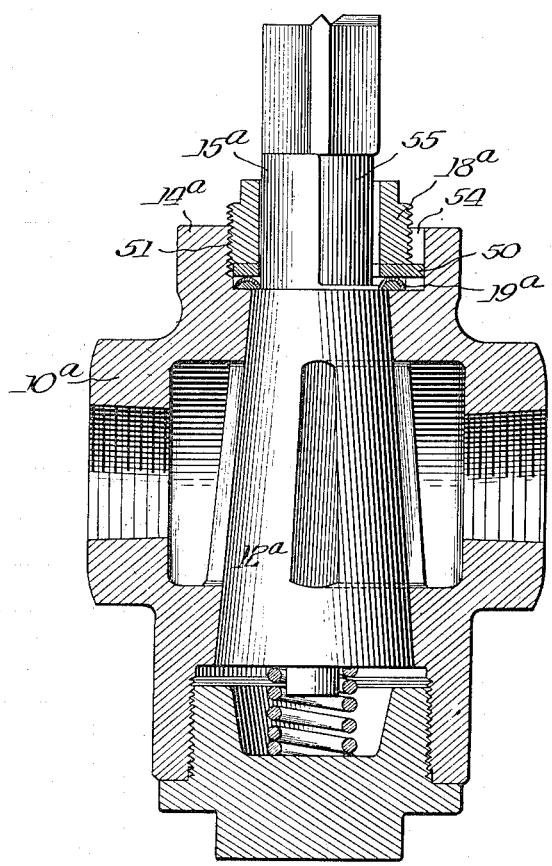
Figure 5 is a vertical sectional elevational view of a modified form of valve structure.

Figure 6 is a plan view of a limit stop member embodied in the device of Figure 5; and Figures 7, 8 and 9 are plan and vertical sectional elevational views of another modified form of valve structure, Figures 8 and 9 being taken on the lines 8—8 and 9—9, respectively, of Figure 7.

On examination of the drawings, it will be observed that in carrying out my present invention in its present embodiment, I employ a valve body 10 having suitable projections 11, 11 whereby suitable, e. g. threaded, connection with pipe leads may be effected. The valve body 10 is cored centrally for the reception of the rotatable plug valve member 12 and forms a seat therefor.

The new plug has a passage 13 adapted to register with openings in the extensions 11, 11 of the body 10, whereby fluid may pass through the valve structure when the passage 13 is brought to register with the openings in the pipe connections 11, 11.

On examination of Figure 1, it will be noted that the plug 12 tapers upwardly and that the valve body 10 is complementarily bored so that when the plug is forced into seating position it fits snugly therein.

At their respective upper portions, the valve body 10 is provided with a lateral annular projection 14 and the plug 12 is provided with upwardly extending stem 15, the extension 14 being countersunk as indicated at 16 and the valve stem being given a cylindrical contour as indicated at 17 to accommodate the lubricant retaining packing.

The said packing comprises in the form here shown a gland 18 and a packing member 19, a plurality of threaded bolts 20 having nuts 21, annular spring washers 22 encircling said bolts being interposed between the gland 18 and the upper surface of the extension 14 of the valve body 10, and ring washers 23 also encircling said bolts are interposed between the nuts 21 and the upper surface of the gland 18.

Inasmuch as the plug 12 tapers upwardly, it is necessarily introduced into the body 10 from below in the present construction, and means are therefore provided for holding the plug 12 in contact with its seat.

Since the insertion of lubricant under pressure, as well as the form of packing employed by me as shortly to be described, both tend to force the valve off its seat, I provide a pressure equalizing port 24 establishing communication between the passage 13 and the chamber 25 below the end of the plug 12, and make use of a yieldingly resistant retention means including a coiled spring 26 encircling a stud 12$^a$ on the plug 12 and seated in a recess 27 in a closing plug 27$^a$.

The said plug 27$^a$ has a threaded connection, as indicated at 27$^b$, with the body 10, whereby the plug 12 may be held against its seat by the force of said spring 26 when the fluid pressure is off and the desired degree of pressure may be exerted against the bottom of the valve member 12.

For introducing the lubricant into the valve structure and forcing it into position to function at the valve seat, that is, between the plug 12 and the body 10, and preventing reflux of the lubricant, I employ an arrangement of passages for conducting the lubricant, and mechanism acting thereupon, now to be described.

A main opening which also serves as a reservoir for the lubricant is provided in the extension 15 of the plug 12, and may be conveniently centrally located therein as indicated at 28$^a$. From this opening 28$^a$ radiate a plurality of distributing passages 28, 28, (four thereof being here shown as disposed 90° apart). From the termini of two of said passages 28, downwardly extending grooves 29 are led toward the lower end of the plug valve member 12 for conducting the lubricant to the functional surface. The ends of these grooves are in turn connected by radial passages 30, 30, whereby, as in the case of the said passages 28, the supply of the lubricant may to a certain extent be equalized.

At the upper end of the extension 15 there is arranged in the opening 28$^a$, a lubricating mechanism which, as here shown, includes a tubular member 31 carrying at its outer end a check-valve device indicated generally at 32, through which the lubricant may be introduced by means of a so-called grease-gun or other pump.

For preventing exudation of the lubricant around the periphery of the member 31, the opening 28$^a$ is chambered for the reception of a packing member here shown as a ring gasket 33 upon which bears a gland 34 having threaded connection as indicated at 35 with the valve stem 15, and into which gland 34 the lubricator member 31 in turn is threaded adjacent to its outer end, the inner end of said member 31 having an enlarged aligning terminal 41.

As above noted, the member 31 is threaded throughout substantially its entire length, whereby reciprocation may be attained by imparting rotatory motion thereto through manual manipulation of the butterfly extensions 36 or the application of a wrench to the hexagonal portion 37 of the casing of the check-valve 32, and thereby lubricant forced into the passages 28, 29, 30, and spread around the valve seat as the operating handle 38 is moved.

Reverting now to the packing structure first referred to above, it will be noted that the member 19 is preferably an annulus of spring metal, bifurcated or bent to a particircular or approximately an inverted U form in cross section, the outer leg or margin of the U bearing circumferentially on the floor 39 of the lateral annular extension 14 of the body or casing 10, and the inner leg or margin bearing on the floor of the shoulder 40 of the plug 12 at the base of the cylindrical portion 17 thereof, and being pressed against such floors.

The said member 19 thereby tends to become expanded toward the angle formed by the inner cylindrical portion of the said body extension 14 and toward the angle formed by the outer cylindrical portion 17 of the plug extension 15, and follow it downward as the gland is advanced against the upper portion of the annulus by turning the nuts 21 on the bolts 20.

As the floor 39 is a relatively fixed plane, it serves as a fulcrum for the outer margin of the annulus 19, relatively to which the inner margin pivots as such margin moves along with the floor 40 and without disturbance of its contact therewith.

In practice, I have found that, inasmuch as in manufacture due care is used to obtain a true bearing surface for the margins of the member 19, by this construction I am enabled to attain a superior tight joint, and one wherein neither freezing of the packing in situ nor disruption or other failure thereof has been met in service.

By the interposition of the split rings 22 between the gland 18 and the extension 14 of the casing (instead of between such gland 18 and the nuts 21), such rings 22 tend to back off the gland 18, save as it is from time to time positively advanced by successive increments of motion imparted to the nuts 21, and thereby save the annulus 19 from accidental distortion.

Thus it will be manifest that the split rings 22 do not serve their usual purpose of affording an additional accumulation of pressure through their being held in position against their inherent resiliency, but contrariwise serve an extraordinary and novel purpose of the limitation if not relief of pressure.

In the use and operation of structures embodying the invention disclosed herein, lubricant is introduced into the valve structure through the check-valve device 32, which may conveniently be one of the bayonet joint form quite generally known as an "alemite" connection.

As the supply of such lubricant is diminished from time to time by the flow of water through the port 13, as particularly occurs when the valve is partly closed by manipulation of the handle 38, the lubricator 31 may by rotation be advanced into the opening 27.

Inasmuch as the stem 31 of the lubricator has a cylindrical terminal 41 preferably in contact with the wall of the opening 28ª, such stem 31 will serve as a plunger to force the lubricant through the passages 28, 29, 30 against the valve seat, but any consequent tendency of the plug 12 to descend under such pressure and thereby stand away from the seat and cause leakage, will be counteracted by the fluid pressure in the chamber 25, reinforced by upward pressure of the spring 26. Furthermore, the terminal 41 will serve as a limit-stop to prevent disengagement of the stem 31 from the gland 34 upon normal retraction of the plunger.

The gasket 33 may comprise a plurality of concentric annular members such as are indicated at 33ª, 33ᵇ and 33ᶜ in Figure 4, each of the annuli being cut transversely as indicated at 34 (Figure 3) so that they may be slightly opened and slipped over the enlarged terminal 41 and still be in close contact with the threads of the stem 31 and thereby prevent leakage thereabout.

In the form of structure shown in Figure 5, a modified form of gland is employed. In this modification, a washer 50 bears on the packing member 19ª and in turn is compressed by a gland 18ª having a threaded connection as indicated at 51 with the extension 14ª of the casing 10ª.

The washer 50 is provided with an external projection 52 and an internal projection 53. The external projection is seated in a complementarily formed enlargement 54 of the opening in the extension 14ª of the body 10ª, and the internal projection 53 extends into a peripheral cut-away portion 55 of the stem 15ª of the plug 12ª.

The cut away portion 55 is of a superficial or peripheral extent sufficient to permit proper opening and closing of the valve, in the present instance a 90° movement thereof, the member 50 thus serving as a limit stop for the valve in both of its movements.

Referring now to the form of structure shown in Figures 7, 8 and 9, another modified form of gland is employed. In the present modification, a washer 50ᵇ bears on the packing member 19ᵇ and in turn is compressed by a gland 18ᵇ. Upon the gland 18ᵇ bears a cap 60 having a threaded connection as indicated at 61 with the extension 14ᵇ of the casing 10ᵇ.

The gland 18ᵇ is provided with a projection 62 extending into a recess 63 formed in the periphery of the stem 15ᵇ of the plug 12ᵇ.

The recess 63 is of an extent adequate to permit the contemplated movements of the valve in opening and closing, viz: a 90° movement, and thus the projection 62 serves as a limit stop.

The pin 64 is provided for the purpose of locating and holding the gland 18ᵇ in the position required for the proper opening and closing of the valve.

Having thus described my invention and illustrated its use, what I claim as new and desire to secure by Letters Patent is:

1. In a valve device, in combination, a valve seat, and a valve member adapted to seat thereon, arranged to form a chamber for a packing member, and a metallic packing member in said chamber having spaced annular portions adapted to seat on said valve seat and on said valve member and to cause relative motion therebetween.

2. In a plug valve device, in combination, a tapered valve seat, a tapered valve adapted to seat thereon, each being shouldered whereby a chamber is formed for the reception of a packing member, and a packing member bifurcated in cross section, having its legs bearing respectively on said seat and on said valve member, and a gland bearing on said packing for causing one of the legs thereof to move the valve member relatively to the seat.

3. In a plug valve device, in combination, a tapered valve seat, a tapered valve adapted to seat thereon, each being shouldered whereby a chamber is formed for the reception of a packing member, and an annular packing member of curved cross section having the peripheral edges thereof marginally bearing on said seat and on said valve member and adapted to move the valve member relatively to the seat.

4. A valve device comprising, in combination, a casing provided with a seat and a chamber adapted to receive a packing, a valve member seated therein, a packing in said chamber, a gland in said chamber bearing on said packing, yieldingly resistant means interposed between said gland and said casing, and means for advancing said gland relatively to said packing and against the resistance of said resistant means.

5. A valve device comprising, in combination, a casing provided with a seat and a chamber adapted to receive a packing, a valve member seated therein, a packing in said chamber, a gland in said chamber bearing on said packing, resilient means interposed between said gland and said casing for retracting said gland, and means for advancing said gland relatively to said packing against the resistance of said resilient means.

6. A valve device comprising, in combination, a casing provided with a seat and a chamber adapted to receive a packing, a valve member seated therein, a packing in said chamber, a gland in said chamber bearing on said packing, a plurality of spaced resilient means interposed between said gland and said casing for retracting said gland, and a plurality of spaced means cooperating with said resilient means for advancing said gland relatively to said packing against the resistance of said resilient means.

7. In a lubricable valve, a chamber for lubricant, and means for moving lubricant through said chamber including a threaded member and a packing in said chamber, an internally threaded gland surrounding said threaded member and engaging said packing, and means for moving said threaded member relatively to said chamber, said threaded member having a terminal adapted to serve as a limit stop.

8. In a lubricable valve, a chamber for lubricant, and means for moving lubricant through said chamber including a threaded member in said chamber, an internally threaded gland surrounding said threaded member, means for moving said threaded member relatively to said chamber, said threaded member having a terminal adapted to serve as a limit stop, and a split packing member interposed between said gland and said terminal and adapted to be slipped over said terminal.

9. In a lubricable valve, a chamber for lubricant, and means for moving lubricant through said chamber including a threaded plunger in and engaging a wall of said chamber, an internally threaded gland surrounding said threaded member, a packing between said gland and a wall of said chamber, means for moving said gland relatively to said chamber, and a packing on said threaded plunger.

10. In a lubricable valve, a chamber for lubricant, and means for moving lubricant through said chamber, including a threaded member and a packing in and engaging a wall of said chamber, an internally threaded gland surrounding said threaded member and engaging said packing, means for moving said threaded member relatively to said gland, and a packing carried by said last mentioned threaded member.

11. In a lubricable valve, a chamber for lubricant, a means for moving lubricant through said chamber, including a threaded member and a packing in said chamber, an internally threaded gland surrounding said threaded member and engaging said packing, means for moving said threaded member relatively to said chamber, a packing for said threaded member, and means for introducing lubricant under pressure into said chamber through said threaded member.

12. In a lubricable valve, a chamber for lubricant, and means for moving lubricant through said chamber including a threaded member in and engaging a wall of said chamber, an internally threaded gland surrounding said threaded member, means for moving said threaded member relatively to said chamber, means for introducing lubricant into said chamber through said threaded member, a packing for said threaded member, and means for preventing reflux of lubricant through said threaded member when said threaded member is advanced in said chamber.

13. In a lubricable valve, a chamber for lubricant, a hollow plunger in said chamber for moving lubricant therethrough, means for moving said plunger relatively to said chamber, a gland having threaded connection with the valve device, means for introducing lubricant into said chamber through said plunger, a packing carried by said plunger engaging the wall of said chamber, and means engaged by said gland for preventing the reflux of lubricant through said introducing means.

14. In a valve device, in combination, a valve seat, a valve member adapted to seat thereon, said valve seat and valve member having shoulders, a packing member including an annulus having a parti-circular cross section, the inner and outer peripheral edges of said packing member respectively bearing on the shoulders on said valve member and seat, and a gland bearing on said packing member.

15. In a valve device, in combination, a valve seat, a valve member adapted to seat thereon, said valve seat and valve member having shoulders, a packing member including an annulus having a parti-circular cross section and a filler therefor, the inner and outer peripheral edges of said packing member respectively bearing on the shoulders on said valve member and seat, and a gland bearing on said packing member adapted to expand said packing member in one direction while compressing it in another direction for moving said valve member relatively to its seat.

16. In a valve device, in combination, a valve seat, a valve member adapted to seat thereon, said valve seat and valve member having shoulders, a packing member including an annulus having a parti-circular cross section and a filler therefor, the inner and outer peripheral edges of said packing member respectively bearing on the shoulders on said valve member and seat, and a gland bearing on said packing member adapted to expand said packing member in one direction while compressing it in another direction for moving said valve member relatively to its seat, said packing being of a nature to assume its normal shape upon release of pressure thereon.

In testimony whereof I have hereunto affixed my signature this 8th day of April, A. D., 1925.

FRANCIS NORWOOD BARD.